Jan. 10, 1956 J. T. BANGERT 2,730,680

WAVE TRANSMISSION NETWORK USING TRANSISTOR

Filed Sept. 3, 1952

INVENTOR
J. T. BANGERT
BY
Ralph T. Holcomb
ATTORNEY 2,730,680

WAVE TRANSMISSION NETWORK USING TRANSISTOR

John T. Bangert, Summit, N. J., assignor to Bell Telephone Laboratories, Incorporated, New York, N. Y., a corporation of New York Application September 3, 1952, Serial No. 307,687

8 Claims. (Cl. 333—80)

This invention relates to wave transmission networks and more particularly to networks employing transistors to provide series negative resistance.

An object of the invention is to provide negative resistance of the series type. A further object is to improve the transmission characteristics of wave transmission networks, such as filters, by compensating the dissipation associated with the network branches.

In acordance with one embodiment of the invention, two transistors, a source of voltage, and other component elements are arranged to form a two-terminal network which will provide a negative resistance of the series type, that is, one which is current-controlled or open-circuit stable. The transistors are of the type having a base, a collector, and an emitter. The network includes a capacitor connected between the collector of the first transistor and the base of the second transistor, two resistors connected in series between the collectors, and two other resistors connected in series between the emitters. The source of voltage interconnects the comon terminal of the first pair of resistors and that of the second pair. The network terminals are the base of the first transistor and the collector of the second. The magnitude of the negative resistance produced may be controlled by adjusting one of the emitter resistors. In some applications, a blocking condenser may be required between the collector of the second transistor and the associated network terminal.

In accordance with a further embodiment of the invention, a negative resistance of this type is connected in series with a reactance in order to compensate the resistance associated with the reactance and thereby increase the sharpness of resonance. Applications of the invention to wave transmission networks having reactive impedance branches are disclosed. As examples, low-pass, band-pass, and band-elimination wave filters of the ladder type are disclosed. The negative resistance may be associated with either a series branch or a shunt branch of the fitter. The negative resistance may, if desired, be made of the proper magnitude to compensate not only the dissipation in the branch in which it is connected but also part or all of that associated with one or more of the other filter branches, especially throughout the pass band and in the regions of transition from transmission to attenuation. The transmission characteristics of the filters are greatly improved by sharpening the cut-offs, reducing the loss in the pass bands, and increasing the attenuation in the suppression bands.

Figure 1:
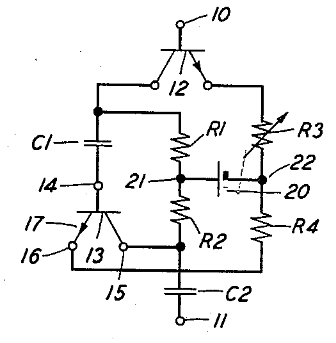
Figure 2:
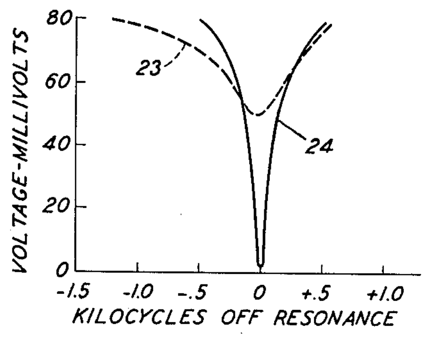
Figure 3:
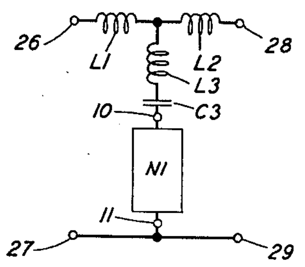
Figure 4:
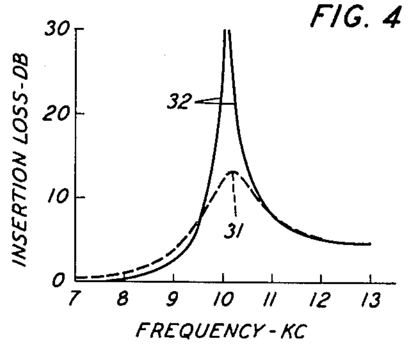
Figure 5:
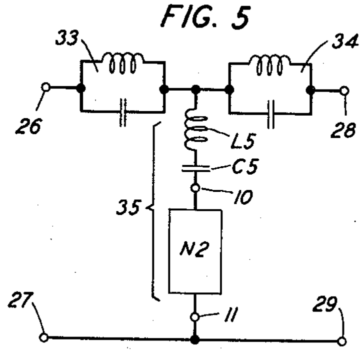
Figure 6:
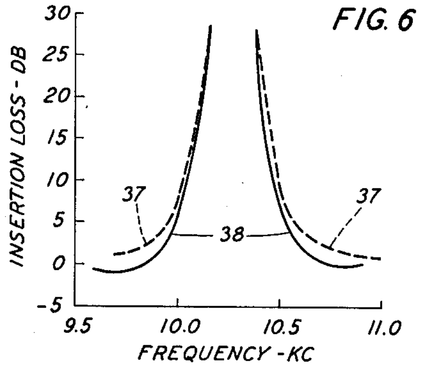
Figure 7:
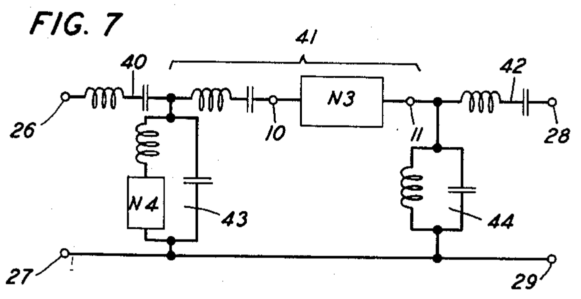

The nature of the invention and its various objects, features, and advantages will appear more fully in the following detailed description of preferred embodiments illustrated in the accompanying drawing, of which Fig. 1 is a schematic circuit of a two-terminal network in accordance with the invention for providing series negative resistance;

Fig. 2 gives comparative resonance characteristics showing the effectiveness of the negative-resistance network when associated with a series-resonant circuit;

Figs. 3, 5, and 7 are schematic circuits, respectively, of low-pass, band-elemination, and band-pass wave filters embodying the invention; and Figs. 4 and 6 are insertion loss-frequency characteristics showing the improvement obtainable by adding the negative-resistance networks to the filters of Figs. 3 and 5, respectively.

The embodiment of the series negative-resistance network in accordance with the invention shown schematically in Fig. 1 comprises a pair of terminals 10 and 11 between which the two transistors 12 and 13 and the other associated component elements are connected. Each of the transistors comprises a base, a collector, and an emitter. In the transistor 13, these are connected, respectively, to the terminals 14, 15, and 16. The transistors may be either the point-contact type or the junction type, but the latter are preferred because, in general, they provide a more constant value of negative resistance for given applied potentials. Transistors of the junction type are described in detail, for example, in the paper by William Shockley entitled "The theory of p-n junctions in semiconductors and p-n junction transistors," published in the Bell System Technical Journal, volume XXVIII, pages 435 to 489, July 1949, and those of the point-contact type in United States Patent 2,524,035, to John Bardeen and Walter H. Brattain, issued October 3, 1950. In Fig. 1, the symbol used for the transistors 12 and 13 indicates that they are of the junction type, inasmuch as the arrowhead 17 associated with the emitter points toward the terminal 16. In the symbol for a point-contact transistor, this arrowhead is reversed.

The network also includes a capacitor C1 connected between the collector of the transistor 12 and the base of the transistor 13, two resistors R1 and R2 connected in series between the collectors, two other resistors R3 and R4 connected in series between the emitters, and a source of direct voltage 20 connected between the common terminal 21 of the resistors R1, R2 and the common terminal 22 of the resistors R3, R. The magnitude of the negative resistance effective between the terminals 10 and 11 depends in part upon the values of the emitter resistors R3 and R4, and a convenient way of controlling it is by adjusting the value of one or both of these. As indicated by the arrow, the resistor R3 is adjustable in the circuit shown. In a typical case, the value of R3 may range between zero and 10,000 ohms, the capacitor C1 may have a value of 0.5 microfarad, the resistors R1, R2, and R4 values of 20,000, 5000, and 5000 ohms, respectively, and the source 20 a voltage of 22.5.

In some applications, it is desirable to provide a blocking capacitor in series with one of the network terminals in order to prevent the establishment of an external direct-current path between the terminals 10 and 15. As shown, the capacitor C2 is included between the terminals 11 and 15 for this purpose. It should be large enough to provide a reactance sufficiently small to pass freely the alternating currents involved. A typical value for C2 is 0.5 microfarad.

Some advantages of a negative-resistance network employing a transistor instead of a thermionic device as the active element are that the transistor does not require an evacuated or gas-filled envelope, or a heated cathode, requires no warm-up time, has little heat to be dissipated, consumes much less power, is smaller and lighter, and has a longer useful life.

The broken-line curve 23 of Fig. 2 shows a resonance characteristic obtainable when a constant current is applied to the series combination of a capacitor and an inductor which are resonant at 18 kilocycles. The voltage in millivolts across the combination is plotted against the frequency in kilocycles off resonance. The solid-line curve 24 of Fig. 2 shows the improvement obtainable in the resonance characteristic by including in series with the combination a negative-resistance network of the type shown in Fig. 1. It is seen that, at the resonant frequency, the terminal voltage is reduced from fifty to four millivolts. The voltage could be reduced to zero by decreasing the value of the resistor R3 or the resistor R4.

A series negative-resistance network of the type shown in Fig. 1 is well adapted for compensating undesired energy dissipation associated with reactive branches of wave transmission networks. Figs. 3, 5 and 7 show, by way of example only, additional embodiments of the invention in which the network of Fig. 1 is connected in a reactive impedance branch of a wave filter.

Fig. 3 shows a mid-series terminated, low-pass, ladder-type filter section of the *m*-derived type having a pair of input terminals 26, 27 and a pair of output terminals 28, 29. The series branches are constituted by two inductors L1 and L2, and the interposed shunt branch comprises an inductor L3 and a capacitor C3 connected in series. A series negative-resistance newtork N1, which may be of the type shown in Fig. 1 between the terminals 10 and 11, is included in the shunt branch in series with L3 and C3. The network N1 may be placed on either side of L3 and C3, or between them. A suitable source fo alternating-current signals may be connected to the input teminals 26, 27 and a suitable load impedance to the output terminals 28, 29. Since the filter section is unbalanced, the terminals 27 and 29 may be grounded or otherwise fixed in potential. The network N1 is designed to compensate the undesired dissipation in the elements L3 and C3, and also, if desired, part or all of that associated with the inductors L1 and L2, throughout the entire pass band and including the transition region, thereby geratly improving the transmission characteristic of the filter. Part or all of the resistance associated with the inductors L1 and L2 may, however, be allowed for in choosing the impedance of the source and the load.

The broken-line curve 31 of Fig. 4 shows a typical insertion loss-frequency characteristic obtainable with the filter of Fig. 3 when the network N1 is omitted, *m* has a value of 0.25, the cut-off is placed at nine kilocycles, and the inductors L1, L2, and L3 have rather poor Q's. For comparison, the solid-line curve 32 shows the transmission characteristic obtainable with the same filter when the network N1 is added. It is seen that the loss in the transmission band is reduced, the cut-off greatly sharpened, and the maximum loss increased by a large factor. By decreasing the value of R3 or R4, the loss in the band can be reduced substantially to zero, or even converted into a gain if desired.

Fig. 5 shows schematically a single section, mid-series terminated, confluent, band-elimination filter of the ladder type. Each of the series impedance branches 33 and 34 is constituted by an inductor and a capacitor connected in parallel. The interposed shunt branch 35 comprises the series combination of an inductor L5, a capacitor C5, and a series negative-resistance network N2, which may be of the type shown in Fig. 1. The network N2 is designed to compensate the dissipation in the shunt branch 35, and may also compensate all or part of that in the series branches 33 and 34. The broken-line curve 37 of Fig. 6 shows the insertion loss-frequency characteristic of this filter when the network N2 is omitted, and the solid-line curve 38 shows the greatly improved characteristic obtainable by adding N2. It will be noted that the cut-offs are sharpened, the loss in the suppression band is increased, and, for the particular setting of R3 employed, a small negative loss, or gain, is obtained in the lower transmission band.

Fig. 7 shows schematically a two-section, mid-series terminated, confluent, band-pass filter of the ladder type. Each of the series impedance branches 40, 41 and 42 comprises an inductor and a capacitor connected in series. Each of the shunt branches 43 and 44 is constituted by the parallel combintaion of an inductor and a capacitor. The central series branch 41 includes a series negative-resistance network N3, which may be of the type shown in Fig. 1, connected in series therewith. The network N3 may be designed to compensate the dissipation in the series branch 41, the shunt branches 43 and 44, and, if desired, part of all of that in the end series branches 40 and 42. In some cases, the undesired dissipation in certain of the filter branches may be compensated more perfectly or more advantageously by including one or more additional negative-resistance networks in the shunt branches 43 and 44. For example, Fig. 7 shows such a network N4, which may also be of the type shown in Fig. 1, connected in series with the inductor in the branch 43. The network N4 is especially effecive in compensating the dissipation in the shunt branch 43 and the adjacent series branches 40 and 41. Similarly, a third negative-resistance network may be included in series with the inductor in the shunt branch 44. It is to be understood that either N3 or N4, or both, may be employed. In this filter, also, the addition of the networks N3 and N4 decreases the loss in the transmission hand, sharpens the cut-offs, and increase the loss outside of the band.

In filter circuits such as those shown in Figs. 3, 5 and 7, it should be pointed out that the inclusion of a negative-resistance device in accordance with the invention will effectively convert a comparatively small, light, inexpensive, low-Q inductor into the electrical equivalent of a large, heavy, expensive, high-Q inductor. Thus, the size, weight, and cost of the network are reduced. Furthermore, the filters may be designed to have types of attenuation characteristics which are completely unobtainable without the use of active elements.

It is to be understood that the above-described arrangements are illustrative of the application of the principles of the invention. Numerous other arrangements may be devised by those skilled in the art without departing from the spirit and scope of the invention.

What is claimed is:

1. A negative-resistance network comprising two terminals between which the negative resistance is effective, two transistors, two resistive impedances at least one of which has a substantial resistive component in the operating frequency range of the network, two resistors, a capacitor, and a source of direct voltage, each of said transistors having a base, a collector, and an emitter, one of said terminals being connected to the base of the first of said transistors, the other of said terminals being connected to the collector of the second of said transistors, said resistive impedances being connected in series between said emitters, said resistors being connected in series between said collectors, said source being connected between the common terminal of said resistive impedances and the common terminal of said resistors, and said capacitor being connected between the collector of said first transistor and the base of said second transistor.

2. A network in accordance with claim 1 which includes a second capacitor connected between said other terminal and the collector of said second transistor.

3. A network in accordance with claim 2 in which one of said resistive impedances is adjustable.

4. A network in accordance with claim 3 in which each of said resistive impedances has a substantial resistive component in said range.

5. A network in accordance with claim 1 in which one of said resistive impedances is adjustable.

6. A network in accordance with claim 1 in which each of said resistive impedances has a substantial resistive component in said range.

7. In combination, a network in accordance with claim 1 and an impedance branch comprising an inductor, said network being connected in series with said inductor and providing negative resistance for compensating dissipation in said inductor.

8. In combination, a network in accordance with claim 1 and a wave filter comprising an impedance branch which includes an inductor, said network being connected in series with said inductor and providing negative resistance for compensating dissipation in said inductor.

References Cited in the file of this patent

UNITED STATES PATENTS

| | | |
|---|---|---|
| 1,701,552 | Zobel | Feb. 12, 1929 |
| 1,772,506 | Affel | Aug. 12, 1930 |
| 1,900,045 | Crisson | Mar. 7, 1933 |
| 2,585,078 | Barney | Feb. 12, 1952 |